US005778846A

United States Patent [19]

Mielke

[11] Patent Number: 5,778,846
[45] Date of Patent: Jul. 14, 1998

[54] FORGED OR CAST PISTON HEAD OF AN OSCILLATING SHAFT PISTON

[75] Inventor: Siegfried Mielke, Neckarsulm, Germany

[73] Assignee: Kolbenschmidt Aktiengesellschaft, Neckarsulm, Germany

[21] Appl. No.: 849,738

[22] PCT Filed: Jan. 16, 1996

[86] PCT No.: PCT/EP96/00145

§ 371 Date: Jul. 3, 1997

§ 102(e) Date: Jul. 3, 1997

[87] PCT Pub. No.: WO96/22459

PCT Pub. Date: Jul. 25, 1996

[30] Foreign Application Priority Data

Jan. 19, 1995 [DE] Germany ........................ 195 01 416.2

[51] Int. Cl.$^{6}$ ........................ F16J 1/14
[52] U.S. Cl. ........................ 123/193.6
[58] Field of Search ........................ 123/193.6

[56] References Cited

U.S. PATENT DOCUMENTS

| | | | |
|---|---|---|---|
| 2,079,441 | 5/1937 | Flammang et al. . | |
| 3,075,817 | 1/1963 | Mayes . | |
| 3,596,571 | 8/1971 | Hill et al. | 123/193.6 |
| 3,943,908 | 3/1976 | Kubis et al. | 123/193.6 |
| 4,011,797 | 3/1977 | Cornet | 123/193.6 |
| 4,517,930 | 5/1985 | Nakano et al. | 123/193.6 |
| 4,532,686 | 8/1985 | Berchem | 123/193.6 |
| 4,581,983 | 4/1986 | Moebus | 123/193.6 |
| 4,662,047 | 5/1987 | Berchem | 123/193.6 |
| 4,708,104 | 11/1987 | Day et al. | 123/193.6 |
| 4,727,795 | 3/1988 | Murray et al. | 123/193.6 |
| 4,781,159 | 11/1988 | Elsbett et al. | 123/193.6 |
| 4,833,977 | 5/1989 | Haahtela et al. | 123/193.6 |
| 4,986,167 | 1/1991 | Stratton et al. | 123/193.6 |
| 5,144,923 | 9/1992 | Leites et al. | 123/193.6 |
| 5,207,147 | 5/1993 | Leites et al. | 123/193.6 |
| 5,261,363 | 11/1993 | Kemnitz | 123/193.6 |
| 5,301,599 | 4/1994 | Dearnley et al. | 123/193.6 |
| 5,357,920 | 10/1994 | Kemnitz et al. | 123/193.6 |
| 5,425,306 | 6/1995 | Binford | 123/193.6 |
| 5,477,821 | 12/1995 | Chapple | 123/193.6 |

FOREIGN PATENT DOCUMENTS

| | | | |
|---|---|---|---|
| 0 019 323 | 11/1980 | European Pat. Off. . | |
| 30 42 461 | 5/1982 | Germany . | |
| 38 32 022 | 9/1989 | Germany . | |
| 39 35 078 | 5/1990 | Germany . | |
| 57-210140 | 12/1982 | Japan | 123/193.6 |
| 1-117970 | 5/1989 | Japan | 123/193.6 |

*Primary Examiner*—David A. Okonsky
*Attorney, Agent, or Firm*—Jones, Tullar & Cooper, P.C.

[57] ABSTRACT

In a piston head of a multiple component piston for internal combustion engines, the piston floor continues radially outwards into the ring section which is provided with the piston ring grooves, the supports which carry the hubs are arranged at a distance from the inner face of the ring section and the piston pin which bears the piston shaft can be mounted in the bores of the piston pin boss. An improved manufacture of the piston head is ensured by connecting the ring section with the piston floor via a weld, solder, friction or positive locking joint.

6 Claims, 5 Drawing Sheets

FORGED OR CAST PISTON HEAD OF AN OSCILLATING SHAFT PISTON

BACKGROUND OF THE INVENTION

1. Technical Field

The present invention relates to a forged or cast piston head of a oscillating shaft piston for internal combustion engines.

The piston has a bottom and a ring section which has the piston ring grooves, and the piston bottom forms a radially outward transition into the ring section. The supports bearing the bosses of the piston head are connected in one piece with the underside of the piston bottom and are attached at a distance from the inside of the ring section. A piston bolt supporting the piston shaft can be seated in the bolt eye bore.

2. Prior Art

In such a piston which, for example, is described in the company publication "75Jahre Kolbenschmidt" [75 Years Kolbenschmidt], of Kolbenschmidt AG, Neckarsulm 1985, p. 60, the guidance and sealing functions are separate from each other. The piston head, which includes the piston bottom, the ring section, the bosses and their supports, is connected with the piston shaft by means of the piston bolt. Because of this design the piston shaft is better shielded from the hot piston bottom and ring section and can therefore be installed with less play than with a one-piece piston, which has advantageous effects on quiet running. The lateral forces caused by the crankshaft have furthermore less effect on the piston head because of the hinged connection. The latter is self-guiding in the cylinder and can be installed in an operationally dependable manner with less play than is possible with a one-piece piston. Sealing towards the combustion chamber is thereby improved as is the amount of blow-through, and carbonization of the ring groove and groove wear are reduced.

With the piston head, which as a rule is made of steel or cast iron and is produced by forging or casting, the shaping of the channel extending behind the ring field becomes extremely difficult because of the size of the bosses.

A piston is known from EP-A-019323, wherein the upper part of the piston and the lower part of the piston rest on each other via ring collar-like supports and are welded to each other in the area of the divided ring field.

SUMMARY OF THE INVENTION

It is an object of the present invention to provide a piston head of the shape described above for an oscillating shaft piston in such a way that improved shaping and improved workability is possible, in particular in the area of the channel revolving behind the ring section.

The noted object is achieved by the provision of a piston head wherein the piston bottom makes a radially outward transition into the ring section, and wherein the supports bearing the bosses and connected with the underside of the piston bottom are attached at a distance from the inside of the ring section and can be seated in the bolt eye bores of the piston bolts supporting the piston shaft, and such that the lower part of the ring section is connected with the upper part of the ring section by means of welding, soldering, frictional or an interlocking connection.

The compound production of the piston head from several differently finished unmachined pieces, the simultaneous application of several joining processes for connecting the unmachines pieces and the combination of several materials lead to an optimal piston component.

BRIEF DESCRIPTION OF THE DRAWINGS

FIG. 1 shows in cross section a piston head for an oscillating shaft piston for Diesel engines along the piston bolt axis and the plane including the piston axis. The piston shown consists of a piston bottom 2, forged in one piece from steel, and having a combustion chamber trough 1. An upper portion of the ring section 3, which radially outwardly adjoins the piston bottom 2 and has a uppermost ring groove; and supports 5, which are disposed at a distance from the interior of the ring section 3, support the bosses 4, and are connected with the underside of the piston bottom 2. A lower part 6 of the ring section 3 consists of austenitic special cast iron or steel and is connected with the upper part by means of a welding seam 7. Bearing bushes 9 have been inserted into the bolt boss bores 8.

In FIG. 2, the piston bottom 10, the bosses 11, in whose bores 12 bearing bushes 13 have been inserted, and the supports 14 bearing the bosses 11 have been forged in one piece of steel. The ring section 15), which has been separately made of austenitic steel, is connected with the piston bottom 10 by means of a welding seam 16.

Figure 3:
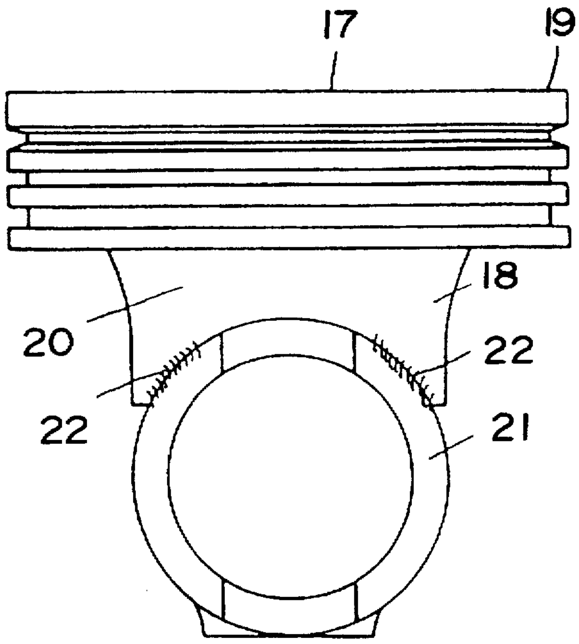
FIG. 3 is a lateral elevation view of a piston head according to one embodiment of the present invention.

A lateral view in the direction of the bolts of a piston head in multi-part construction is represented in FIG. 3, wherein the piston bottom 17, the supports 18 connected with it and the ring section 19 are forged in one piece from tempering steel. The supports 18 are provided with a boss segment 20 into which the boss rings 21, which have been made separately by casting from cast iron material with nodular graphite, have been inserted and connected with it by means of welding seams 22.

Figure 4:
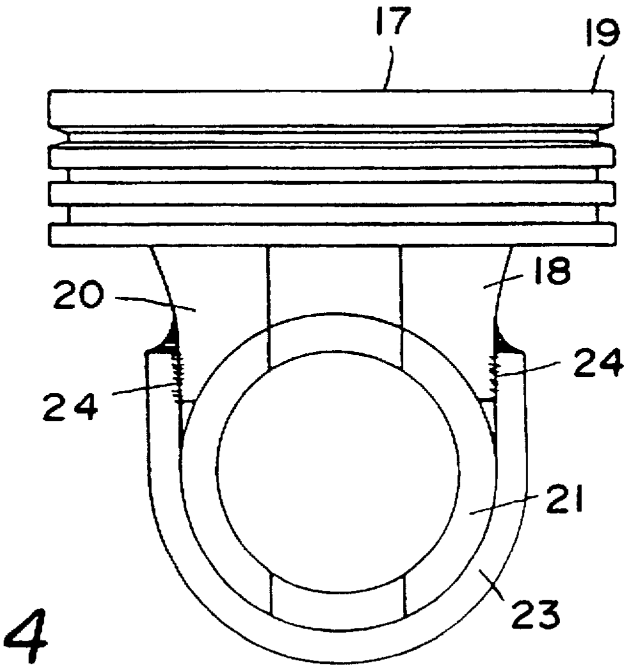
FIG. 4 is a lateral elevation view of a piston head according to another embodiment of the present invention.

A variant of the piston head shown in FIG. 3 is the piston head shown in FIG. 4 which shows the boss rings 21 pressed against the boss segments 20 by means of steel bands 23, whose ends are connected with and positioned by the supports 18 via welding seams 24.

Figure 5:
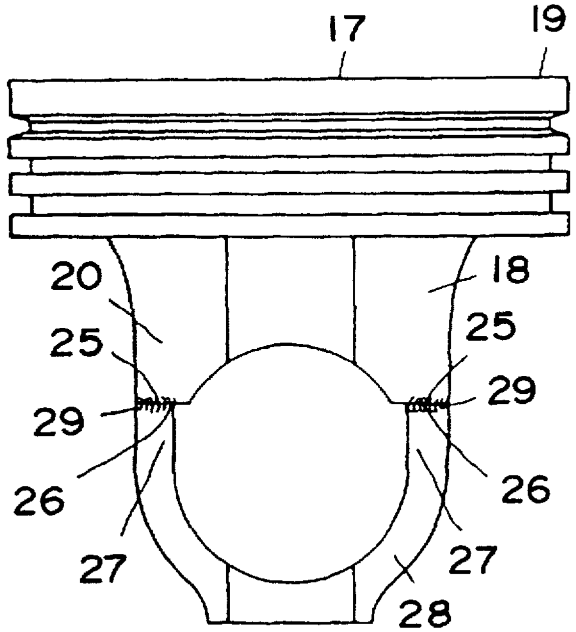
FIG. 5 is a lateral elevation view of a piston head according to one embodiment of the present invention.

A further variant of the piston head shown in FIG. 3 is the piston head shown in FIG. 5. Here the joints 25 of the boss segments 20 connected with the supports 18, are connected by means of welding seams 29 with the joints 26 of the legs 27 of the lower boss segments 28 which protrude past the horizontal center plane of the piston bolt, not shown.

Figure 6:
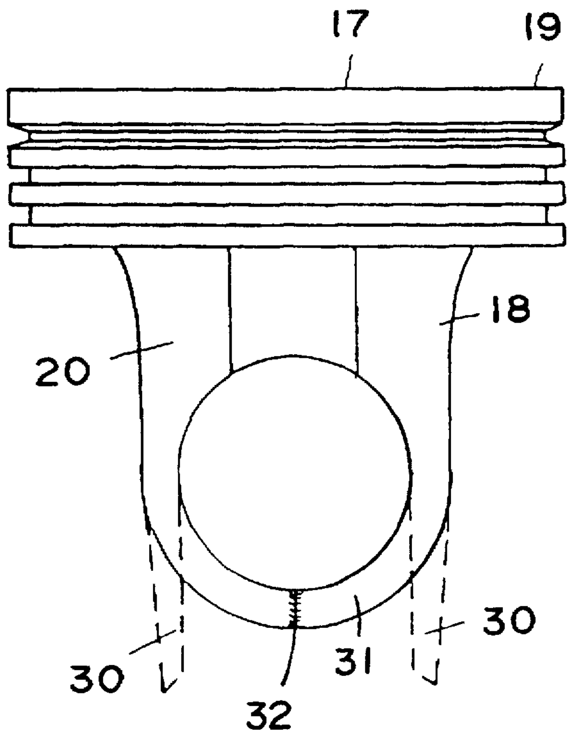
FIG. 6 is a lateral elevation view of a piston head according to another embodiment of the present invention.

Another variant of the piston head in accordance with FIG. 3 is shown in FIG. 6, in which sections 30, which protrude by a partial circular arc length, are forged to the upper boss segments 20 and are shaped by bending them toward the lower boss segments 31, and the sections 30 are connected by a welding seam 32.

Figure 7:
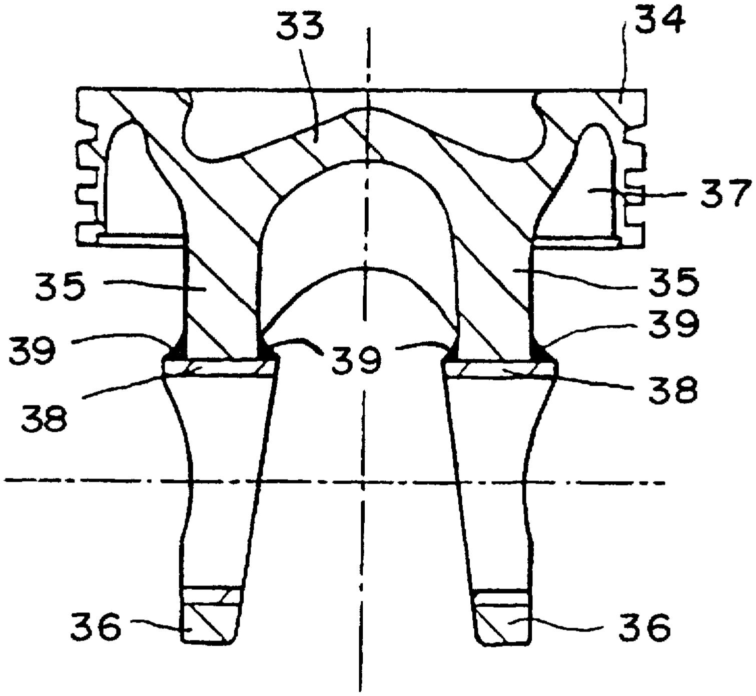
FIG. 7 is a cross section through a piston head according to another embodiment of the present invention.

FIG. 7 represents a cross section through a piston head for a piston in multi-part construction, which extends along the piston axis and the piston bolt axis. The piston bottom 33, the ring section 34, the support 35 connected with the piston bottom 33 and the bosses 36 are forged in one piece from tempering steel. In order to improve forging of the channel 37 extending behind the ring section 34, the bosses 36 in the section toward the piston bottom are embodied narrower than the width of the bearing bushes 38 inserted into the bosses 36. The lateral projection of the bearing bushes 38 is supported by fillet welds 39, which guide the force flow out of the bearing bushes 38 into the bosses 35.

Figure 8:
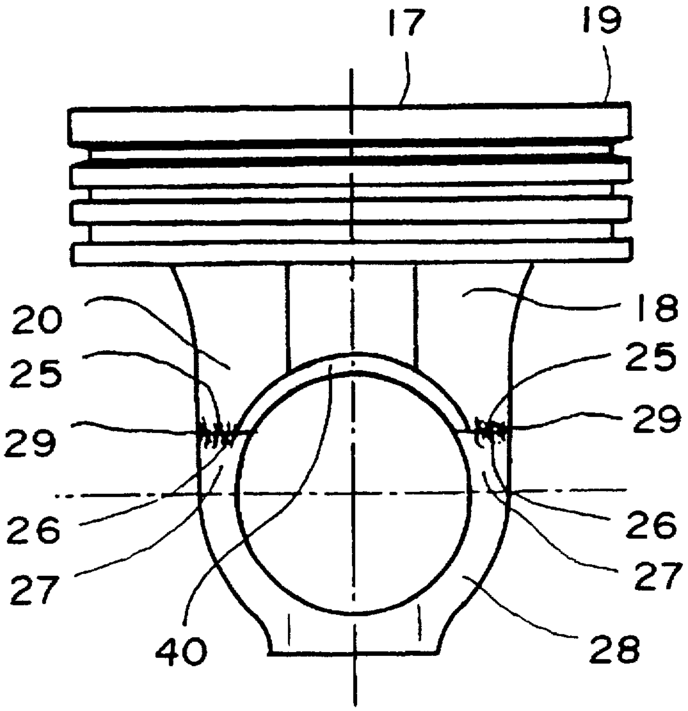
FIG. 8 is a lateral elevation view of a piston head according to a variant of that shown in FIG. 5.

FIG. 8 shows a variant of the piston head in accordance with FIG. 5, wherein a bearing box 40, which is supported on the joints 26 of the lower boss segments 28, has been inserted into the respective upper boss segments 20.

Figure 1:
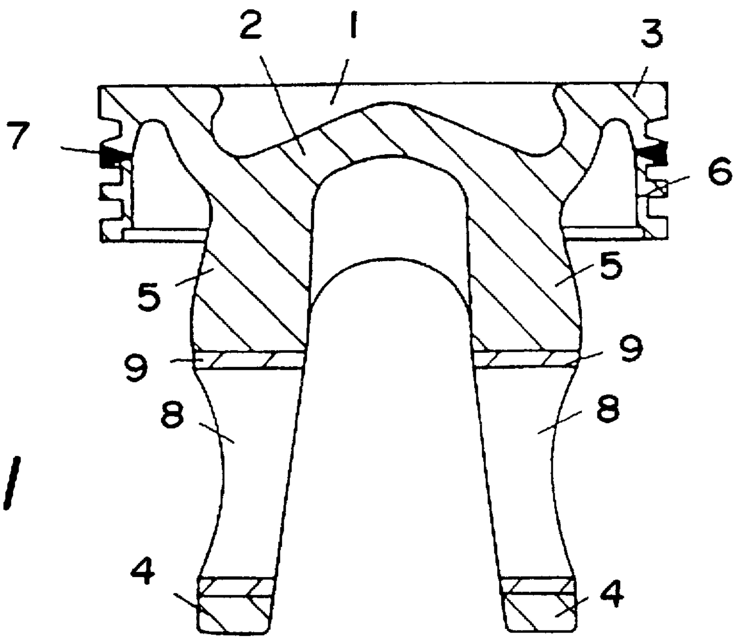
FIG. 1 is a cross section through a piston head according to one embodiment of the present invention.
Figure 2:
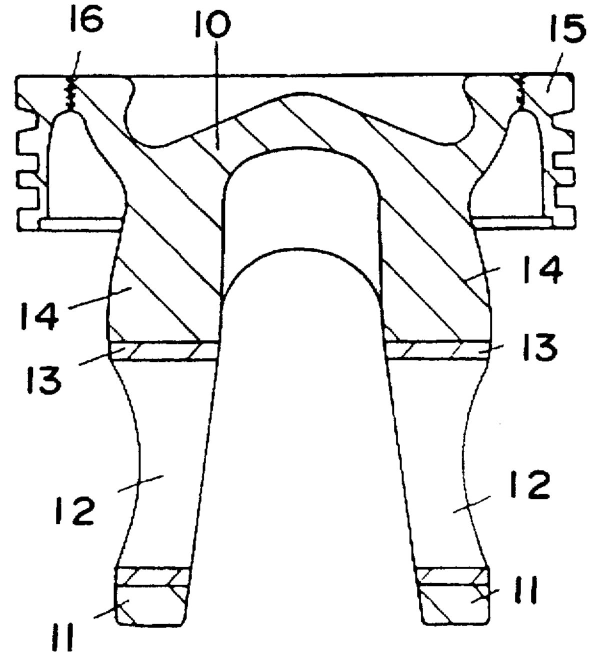
FIG. 2 is a cross section through a piston head according to another embodiment of the present invention.
Figure 9:
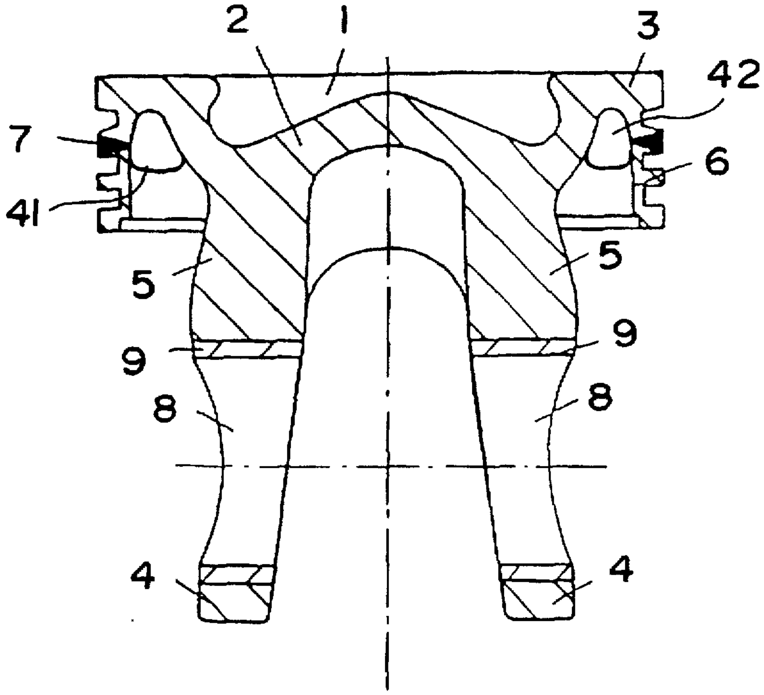
FIG. 9 is a cross section through a piston head according to a variant of that shown in FIG. 1.

A further embodiment of the piston head in accordance with FIG. 1 is represented in FIG. 9. For forming a cooling channel 42, a circular sheet metal element 41, which is trough-shaped in cross section, has been disposed in the ring chamber located behind the inside of the ring section 3 above the horizontal plane which includes the lower boss flank of the second ring boss.

Practically all welding and soldering processes are suitable for producing the compound construction of the piston head.

I claim:

1. A forged or cast piston head of an oscillating shaft piston for internal combustion engines, comprising: a piston bottom; a ring section which defines piston ring grooves, said piston bottom forming a radially outward transition into the ring section; a support bearing a boss, said support bearing and said boss being formed in one piece with the underside of said piston bottom and located at a distance from the inside of said ring section, wherein said support bearing and boss define a bolt eye bore, and wherein said ring section or lower part of said ring section is connected with said piston or an upper part of said ring section by means of one of a welding, soldering, frictional or interlocking connection.

2. The piston head in accordance with claim 1, wherein said piston bottom consists of one of: steel, preferably tempering steel and forged steel; cast iron, preferably cast iron with nodular graphite; tempered cast irons or aluminide material, in particular $TiAl_2$ and $Ni_2Al$, and wherein said ring section consists of one of: an aluminum piston alloy, of austenitic special cast iron; or of one of the materials of said piston bottom.

3. The piston head in accordance with claim 1, wherein a ring chamber is located behind the inside of said ring section and above a horizontal plane enclosing the lower boss flank of the second ring boss, a circular-ring-shaped flat or trough-shaped in cross section sheet metal piece is disposed, for delimiting a cooling channel, and is connected material to material with the welding or soldering seam.

4. The piston head in accordance with claim 2, wherein a ring chamber is located behind the inside of said ring section and above a horizontal plane enclosing the lower boss flank of the second ring boss, a circular-ring-shaped flat or trough-shaped in cross section sheet metal piece is disposed, for delimiting a cooling channel, and is connected material to material with the welding or soldering seam.

5. The piston head in accordance with claim 3, wherein the clearance of the cooling channel on both sides of a horizontal plane extending above the second ring boss is greater by at least 0.2 mm than at the narrowest part of the cooling channel.

6. The piston head in accordance with claim 4, wherein the clearance of the cooling channel on both sides of a horizontal plane extending above the second ring boss is greater by at least 0.2 mm than at the narrowest part of the cooling channel.

* * * * *

UNITED STATES PATENT AND TRADEMARK OFFICE

CERTIFICATE OF CORRECTION

PATENT NO. : 5,778,846

DATED : July 14, 1998

INVENTOR(S) : Siegfried Mielke

It is certified that error appears in the above-identified patent and that said Letters Patent is hereby corrected as shown below:

Claim 1, column 3, line 38, (last line), --a-- should be inserted between "or" and "lower".

Claim 2, column 4, line 7, "irons" should be --iron;--.

Signed and Sealed this

Thirteenth Day of July, 1999

Attest:

Q. TODD DICKINSON

Attesting Officer

*Acting Commissioner of Patents and Trademarks*